(12) United States Patent
Kondo

(10) Patent No.: US 8,701,845 B2
(45) Date of Patent: Apr. 22, 2014

(54) SUSPENSION DEVICE

(75) Inventor: Takuhiro Kondo, Tokyo (JP)

(73) Assignee: Kayaba Industry Co., Ltd., Minatu-ko (JP)

( * ) Notice: Subject to any disclaimer, the term of this patent is extended or adjusted under 35 U.S.C. 154(b) by 683 days.

(21) Appl. No.: 12/866,300

(22) PCT Filed: Jan. 15, 2009

(86) PCT No.: PCT/JP2009/050909
§ 371 (c)(1),
(2), (4) Date: Sep. 1, 2010

(87) PCT Pub. No.: WO2009/098943
PCT Pub. Date: Aug. 13, 2009

(65) Prior Publication Data
US 2011/0001296 A1   Jan. 6, 2011

(30) Foreign Application Priority Data
Feb. 8, 2008   (JP) .................................. 2008-028514

(51) Int. Cl.
*B60G 17/00*   (2006.01)
*B60G 17/015*  (2006.01)
*F16F 15/027*  (2006.01)

(52) U.S. Cl.
USPC .................. 188/266.1; 188/266.3; 188/266.5; 188/267; 188/290; 188/297; 267/34; 267/64.24; 267/195; 280/5.5; 280/5.507; 280/5.514; 280/5.515

(58) Field of Classification Search
USPC ................ 188/266.1, 267, 266.5, 314, 266.3, 188/266.7, 290; 267/64.24, 34; 280/5.515
IPC ......................................................... F16F 15/03
See application file for complete search history.

(56) References Cited

U.S. PATENT DOCUMENTS

| 4,815,575 A * | 3/1989 | Murty ........................ 188/266.1 |
| 5,434,782 A * | 7/1995 | Henry .............................. 701/37 |
| 2005/0212189 A1* | 9/2005 | Kondo et al. ................. 267/195 |
| 2006/0096815 A1* | 5/2006 | Kondo et al. ............... 188/266.5 |
| 2008/0164111 A1* | 7/2008 | Inoue et al. .................... 188/297 |

FOREIGN PATENT DOCUMENTS

| JP | 090440/1990 | 7/1990 | |
| JP | 8-197931 | 8/1996 | |
| JP | 2000-027922 | 1/2000 | |
| JP | 2001-180244 | 7/2001 | |
| JP | 2003-343648 | 12/2003 | |
| JP | 2005256922 A * | 9/2005 | ............. F16F 15/03 |
| JP | 2007-302194 | 11/2007 | |

* cited by examiner

*Primary Examiner* — Robert A Siconolfi
*Assistant Examiner* — San Aung
(74) *Attorney, Agent, or Firm* — McGlew and Tuttle, P.C.

(57) ABSTRACT

A suspension device (S) comprises: an actuator (A) including a motion conversion mechanism (T) for converting rotational motion of a screw nut (1) to linear motion of a threaded shaft (2), and a motor (M) connected to the screw nut (1); and a fluid pressure damper (D) connected to the threaded shaft (2), wherein the threaded shaft (2) is formed in a cylindrical shape, a connecting shaft (30) for connecting a rod (31) or a cylinder (32) of the fluid pressure damper (D) to the threaded shaft (2) is inserted into the threaded shaft (2), and the connecting shaft (30) is connected to an end, opposite to the fluid pressure damper, of the threaded shaft (2). Accordingly, the connection between the actuator and the hydraulic damper is facilitated.

17 Claims, 1 Drawing Sheet

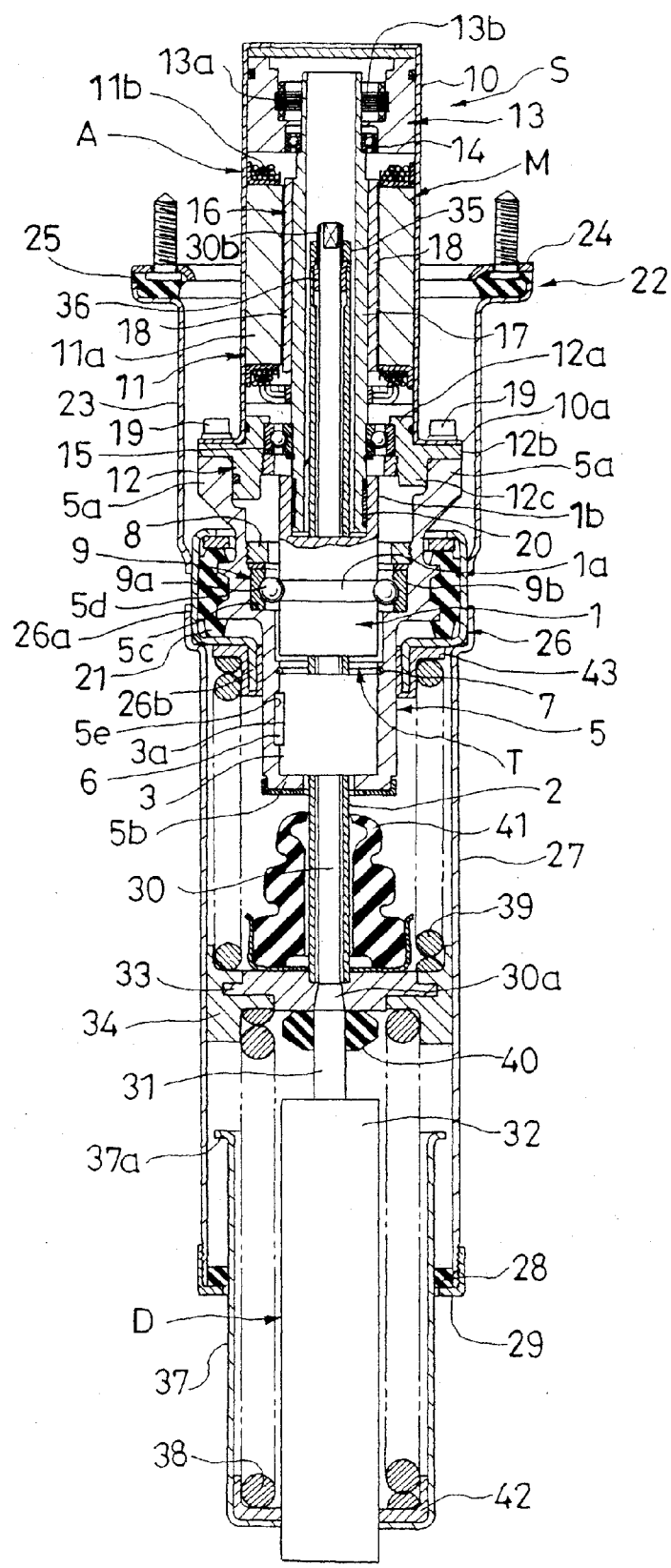

SUSPENSION DEVICE

FIELD OF THE INVENTION

The present invention relates to an improved suspension device for suppressing relative movement between a vehicle body and an axle by an electromagnetic force generated in a motor.

DESCRIPTION OF THE RELATED ART

As this kind of suspension device, as disclosed in Japanese Patent Application Laid-Open No. 2001-180244, a suspension device comprising a hydraulic damper and an actuator for providing a thrust to a piston rod of the hydraulic damper is proposed. In this device, a rod of the hydraulic damper is formed in a cylindrical shape with an internal thread part being provided on the inner circumferential side of the rod, and a shaft having one end connected to a rotor of a motor and the other end connected to an external thread member to be screwed to the internal thread part of the rod is inserted to the rod of the hydraulic damper, whereby the piston rod of the hydraulic damper is constituted by the above-mentioned shaft and rod.

This proposal intends to damp vibration by adding, to a damping force generated by the hydraulic damper, a force which is generated when relatively moving the shaft and the rod in the axial direction by a motor to extend/contract the piston rod, or by converting a torque of the motor to a force in the relative movement direction of the shaft and the rod to thereby additively act this force on the damping force of the hydraulic damper.

Another suspension device is also disclosed in Japanese Patent Application Laid-Open No. 08-197931, the suspension device comprising: a coil spring for elastically supporting a vehicle body side or a sprung member side of a vehicle; an actuator including a threaded shaft rotatably screwed to a ball screw nut connected to an axle or an unsprung member side, and a motor interposed between a pair of springs while being connected to one end of the threaded shaft and elastically supported on the sprung member side; and a hydraulic damper fixed to the vehicle body side to damp vertical vibration of the actuator, in which the relative movement between the vehicle body and the axle is actively controlled by the thrust of the actuator.

DISCLOSURE OF THE INVENTION

The above-mentioned conventional suspension devices are problematic in the following point.

In the conventional suspension devices in which the hydraulic damper is serially connected to the actuator as described above, since the hydraulic damper that is a heavy product must be connected to the actuator at a connecting part located at the middle of the suspension device in assembling of the hydraulic damper and the actuator, the assembling operation is troublesome, and worker's burden is also increased.

In view of the above-mentioned defect, the present invention provides a suspension device in which connection between an actuator and a hydraulic damper is facilitated.

To attain the above-mentioned object, a suspension device according to the present invention comprises: an actuator including a motion conversion mechanism for converting rotational motion of a screw nut to linear motion of a threaded shaft, and a motor connected to the screw nut; and a fluid pressure damper connected to the threaded shaft, in which the threaded shaft is formed in a cylindrical shape, a connecting shaft for connecting a rod or a cylinder of the fluid pressure damper to the threaded shaft is inserted into the threaded shaft, and the connecting shaft is connected to an end, opposite to the fluid pressure damper, of the threaded shaft.

According to the suspension device of the present invention, in an assembling process for integrating the fluid pressure damper to the actuator, the fluid pressure damper that is a heavy product can be integrated to the actuator not by the connecting operation at the middle of the fluid pressure damper and the actuator, but only by an operation from the side opposite to the fluid pressure damper. Therefore, the connecting operation of the fluid pressure damper to the actuator is facilitated, and the worker's burden can be also remarkably reduced.

BRIEF DESCRIPTION OF THE DRAWING

FIG. 1 is a vertical sectional view of a suspension device according to a preferred embodiment of the present invention.

BEST MODE FOR CARRYING OUT THE INVENTION

The present invention will be then described based on a preferred embodiment shown in the drawing.

A suspension device S according to one preferred embodiment of the present invention, as shown in FIG. 1, basically comprises: an actuator A including a motion conversion mechanism T for converting rotational motion of a ball screw nut 1 that is a screw nut to linear motion of a threaded shaft 2, and a motor M connected to the ball screw nut 1; and a fluid pressure damper D connected to the threaded shaft 2.

This suspension device S can function as an actuator since the threaded shaft 2 can be linearly moved in the vertical direction in FIG. 1 by driving and rotating the ball screw nut 1 by the torque generated by the motor M.

When the threaded shaft 2 is forcedly linearly moved by an external force, a rotor R of the motor M performs rotational motion, while the motor M works to generate a torque for suppressing the rotational motion of the rotor R resulting from induction electromotive force to suppress the linear motion of the threaded shaft 2. That is, in this case, the linear motion in the vertical direction in FIG. 1 of the threaded shaft 2 that is a linear motion side member is suppressed by a regenerative torque that the motor M generates by regeneratively converting an externally input kinematic energy into an electric energy.

That is, this suspension device S can provide a thrust to the threaded shaft 2 by causing the motor M to actively generate the torque, and also can suppress the linear motion of the threaded shaft 2, when the threaded shaft 2 is forcedly moved by external force, by the regenerative torque generated by the motor M.

Accordingly, this suspension device S can simultaneously perform, for example, attitude control of a vehicle body of a vehicle, when used by being interposed between the vehicle body and axle of the vehicle, since it not only simply generates the damping force for suppressing the linear motion of the threaded shaft 2 but also works as the actuator. Thus, this suspension device S can function also as an active suspension.

In this suspension device S, the fluid pressure damper D is serially connected to the threaded shaft 2, and this fluid pressure damper D is provided mainly for the purpose of absorbing high frequency vibration. That is, the fluid pressure damper D absorbs, upon input of high frequency vibration such as a vibration with relatively large acceleration, its vibration energy by being serially connected to the actuator A large in moment of inertia which is difficult to extend/contract, in response to input of high frequency vibration, and easy to transmit the vibration.

The suspension device S can effectively perform vibration suppression, upon input of not only low frequency vibration but also high frequency vibration by running on a projection on road, to improve the vehicle ride quality.

For details, the threaded shaft 2 is formed in a cylindrical shape as shown in FIG. 1, and includes a spiral thread groove (not shown), which is formed on the outer circumference thereof; and a linear spline groove (not shown), which is formed along its axial line, namely, the linear motion direction of the threaded shaft 2. To prevent the threaded shaft 2 from dropping out of a ball spline nut 3 to be hereinafter described, the spline groove does not have to be formed at both terminal ends of the threaded shaft 2, and the number of spline groove to be provided can be optionally set.

On the other hand, the ball screw nut 1 is not shown in detail as it is well-known, but includes a spiral passage provided on the inner circumference of a cylindrical body to face the thread groove of the threaded shaft 2; a circulation path provided within the cylindrical body to communicate both ends of the above-mentioned passage with each other; a plurality of balls housed in the passage and circulation path and traveling along the thread groove; and a spacer interposed each between the balls, in which each ball can circulate in the looped passage and circulation path. Although smooth linear motion of the threaded shaft 2 is attained by using the ball screw nut 1 as a screw nut in this embodiment, a nut simply including a screw thread screwed to the thread groove of the threaded shaft 2 may be also adopted. An annular groove 1*a* is provided on the outer circumference of the ball screw nut 1, and a cylindrical socket 1*b* is provided at the upper end thereof in FIG. 1.

A locking mechanism of the threaded shaft 2 is required to linearly move the threaded shaft 2 by the rotary drive of the ball screw nut 1. In this embodiment, the locking mechanism is constituted by the spline groove provided on the outer circumference of the threaded shaft 2 and the ball spline nut 3. The ball spline nut 3 is not shown in detail since it is well-known, but includes a linear passage provided on the inner circumference of a cylindrical body to face the spline groove provided on the outer circumference of the threaded shaft 2; a circulation path provided within the cylindrical body to communicate both ends of the passage with each other; a plurality of balls housed in the passage and circulation path and traveling along the spline groove; and a spacer interposed each between the balls, in which each ball can circulate in the above-mentioned looped passage and circulation path. A key groove 3*a* is provided on the lateral of the ball spline nut 3.

The ball screw nut 1 is screwed to the threaded shaft 2 along the thread groove, and the ball spline nut 3 is inserted to the threaded shaft 2 along the spline groove.

Both the ball screw nut 1 and the ball spline nut 3 are retained by the inner circumference of a cylindrical holder 5 with the ball screw nut 1 being up in FIG. 1.

The holder 5 is formed in a cylindrical shape, and includes a plurality of nut parts 5*a* with screw hole, each provided to protrude toward the upper end outer circumference in FIG. 1; a flange 5*b* protruding inwardly from the lower end inner circumference in FIG. 1; a stepped part 5*c* provided at the middle of the inner circumference; an installation part 5*d* for installing a rubber vibration isolator 21, which is composed of a pair of annular projections provided at the middle of the outer circumference; and a key groove 5*e* provided in the inner circumference below the stepped part 5*c* in FIG. 1.

The ball spline nut 3 is fitted to the inner circumference of the holder 5 below the stepped part 5*c*, and retained in the holder 5 in a locked state by a key 6 inserted to the key groove 3*a* provided in the outer circumference of the ball spline nut 3 and to the key groove 5*e* provided in the inner circumference of the holder 5.

The ball spline nut 3 is held between a snap ring 7 attached to the inner circumference of the holder 5 and the flange part 5*b* of the holder 5 while abutting on the upper end in FIG. 1 of the ball spline nut 3, and is prevented from dropping out of the holder 5.

The ball screw nut 1 is rotatably retained by the holder 5 through a ball bearing 9 which is fixed to the inner circumference of the holder 5 while being held between the stepped part 5*c* provided on the inner circumference of the holder 5 and a nut 8 screwed to the inner circumference of the holder 5. A ball 9*a* of the ball bearing 9 travels along an annular groove 1*a* formed in the outer circumference of the ball screw nut 1, and the ball screw nut 1 can be fixed to the holder 5 by causing the ball screw nut 1 itself to work as an inner ring of the ball bearing 9, and fixing an outer ring 9*b* of the ball bearing 9 to the holder 5. The ball screw nut 1 and the ball spline nut 3 are arranged adjacently to each other while being retained by the holder 5.

That is, the motion conversion mechanism T composed of the ball screw nut 1 and the threaded shaft 2 is retained by the holder 5 as an assembly with the threaded shaft 2 being locked, and when the ball screw nut 1 performs rotational motion, the threaded shaft 2 is locked by the ball spline nut 3, whereby the threaded shaft 2 performs linear motion in the vertical direction in FIG. 1.

In this embodiment, since the ball screw nut 1 and the threaded shaft 2 in the motion conversion mechanism T and further the ball spline nut 3 as the locking mechanism of the threaded shaft 2 are made into an assembly, as described above, with the threaded shaft 2 and the ball screw nut 1 being axially aligned by holding these members by one holder 5, the operation of the motion conversion mechanism T is assured.

Accordingly, since the motor M is fixed to the holder 5 with the shaft 17 of the motor M being axially aligned to the threaded shaft 2 and the ball screw nut 1 by the holder 5, the thread groove of the threaded shaft 2 and the ball as the screw thread of the ball screw nut 1 are never loaded, or no radial bias load acts on the shaft 17 of the motor M. Consequently, reduction in life of the actuator A or deterioration of durability of the suspension device S is never caused.

Further, since the shaft 17 of the motor M is axially aligned to the threaded shaft 2 and the ball screw nut 1 by the holder 5, the suspension device S can be mounted on a vehicle without axial alignment operation between the threaded shaft 2 and the ball screw nut 1, and the mounting operation on the vehicle is thus remarkably facilitated, compared with the conventional suspension device.

Further, since the assembling of the actuator A is completed by making the threaded shaft 2 and the ball screw nut 1 into an assembly by the holder 5 and connecting the motor M to this assembly, the assembling process in the part of the actuator A of the suspension device S is also facilitated.

That is, the above-mentioned integral retainment of all components of the motion conversion mechanism T by the holder 5 has the following advantages: the connection of the motor M to the motion conversion mechanism T can be performed without the operation of rotating the ball screw nut 1 to pull the threaded shaft 2 into the motor M, which is required when adopting a structure such that a member which performs rotational motion of the motion conversion mechanism T or the ball screw nut 1 in this case is not retained by the holder 5 but incorporated to the motor M side, and further without consideration for locking between holders, which is required when adopting, instead of the incorporation of the ball screw nut 1 to the motor M, a structure such that the ball screw nut 1, the threaded shaft 2 and the ball spline nut 3 are retained respectively by different holders.

The above-mentioned advantages of retaining the ball screw nut 1, the threaded shaft 2 and the ball spline nut 3 by one holder 5 never precludes adoption of the structure such that the ball screw nut 1, the threaded shaft 2 and the ball spline nut 3 are retained respectively by different holders.

The length of the threaded shaft 2 located in a section between the ball screw nut 1 used to axially drive the threaded shaft 2 and the ball spline nut 3 that is a component of the locking mechanism of the threaded shaft 2 can be reduced by arranging the ball screw nut 1 and the ball spline nut 3 adjacently to each other.

The part located in the above-mentioned section of the threaded shaft 2 is to be twisted by the rotary drive of the ball screw nut 1, and the shorter the section is, the shorter the part to be twisted is.

Since the threaded shaft 2 works also as a spring element by being twisted, it takes longer time for the linear motion of the threaded shaft 2 to respond to the rotation of the ball screw nut 1 as the section to be twisted is longer. However, since the section to be twisted of the threaded shaft 2 can be reduced by arranging the ball screw nut 1 and the ball spline nut 3 adjacently to each other as described above, the responsiveness of the suspension device S, when functioning as the actuator, is improved.

The improved responsiveness of the suspension device S when functioning as the actuator leads to improved controllability when actively controlling the vehicle attitude.

On the other hand, the motor M includes, as shown in FIG. 1, a topped cylindrical casing 10; a stator 11 fixed to the inner circumference of the casing 10, the stator including a core 11a that is an armature iron core and a coil 11b wound around the core 11a; an annular cap 12 fitted to the lower end opening in FIG. 1 of the casing 10; a cylindrical sensor holder 13 housed in and fixed to the top side inner circumference of the casing 10, the holder retaining a resolver stator 13 on its inner circumference; and a rotor 16 rotatably housed in the casing 10 through a ball bearing 14 fixed to the inner circumference of the sensor holder 13 and a ball bearing 15 fixed to the inner circumference of the cap 12. The cap 12 includes a cylindrical part 12a fitted to the inner circumference of the casing 10; a collar part 12b provided on the outer circumference of the cylindrical part 12a to abut on a flange 10a provided on the lower end outer circumference in FIG. 1 of the casing 10; and a cylindrical fitting part 12c suspended from the cylindrical part 12a and fitted to the upper end inner circumference of the holder 5.

The rotor 16 includes a cylindrical shaft 17, and a magnet 18 attached to the middle outer circumference of the shaft 17 so as to face the core 11a, and the shaft 17 is rotatably housed in the casing 10 with its upper end being pivotally supported by the inner circumference of the ball bearing 14 and its lower end being pivotally supported by the inner circumference of the ball bearing 15. Although the magnet 18 is formed in an annular shape by adhering a plurality of magnets so that N-pole and S-pole are alternated along the circumference, an annular magnet having a split pole pattern in which N-pole and S-pole are alternated along the circumference can be also used.

Accordingly, various types can be used as the motor M, in addition to the structure as a brushless motor in this embodiment, and concrete examples thereof include DC motor, AC motor, induction motor, and synchronous motor.

A resolver core 13b is attached in a position facing the resolver stator 13a fixed to the inner circumference of the sensor holder 13 on the upper end outer circumference of the shaft 17 in the rotor 16, so that a rotational position of the rotor 16 can be detected by the resolver stator 13a and resolver core 13b. Thus, the motor M can be controlled based on the rotational position or rotating speed of the rotor 16 by a control device (not shown) which controls current-carrying to the coil 11b. As a means for performing position detection of the rotor 16, a magnetic sensor such as a Hall element, a rotary encoder or the like can be adopted in addition to the above-mentioned resolver.

Although it is a matter of course that the ball bearing 14 and the resolver stator 13b can be directly fixed to the casing 10 without through the sensor holder 13, the use of the sensor holder 13 offers an advantage that the ball bearing 14 and the resolver stator 13b can be fixed within the casing 10 without special processing to the casing 10.

The thus-constituted motor M is thread-fastened and mounted on the upper end in FIG. 1 of the holder 5 by a bolt 19. For details, the motor M is fixed to the upper end of the holder 5 by screwing the bolt 19 inserted through the flange 10a of the casing 10 and the collar part 12b of the cap 12 to the nut part 5a provided on the upper end outer circumference of the holder 5.

When the motor M is integrated to the holder 5, the shaft 17 of the motor M is connected to the ball screw nut 1 by inserting the lower end of the shaft 17 to the inner circumference of a socket 1b of the ball screw nut 1, so that the threaded shaft 2 can be linearly moved in the vertical direction in FIG. 1 by driving and rotating the ball screw nut 1 by the motor M. Thus, the motor M can be connected to the motion conversion mechanism T only by fixing the motor M to the holder 5 to assemble the actuator A.

A tolerance ring 20 is interposed between the outer circumference of the shaft 17 and the inner circumference of the socket 1b, and the tolerance ring 20 works as a torque limiter for regulating the upper limit of relative rotary torque around an axis which acts on the shaft 17 and the ball screw nut 1.

For details, the tolerance ring 20, which is formed in an annular shape by use of a corrugated sheet material, works as the torque limiter in the following manner. The tolerance ring 20 exhibits an energizing force, when interposed between the shaft 17 and the socket 1b, as a reaction of radial compression of corrugations formed on the sheet material, and according to the energizing force, a friction force against the relative rotation of the shaft 17 and the socket 1b is caused between the tolerance ring 20 and the shaft 17 and socket 1b, in which the shaft 17 and the ball screw nut 1 are integrated together without relative rotation until a relative torque causing the relative rotation exceeds the friction force, while the shaft 17 and the ball screw nut 1 are relatively rotated when the relative torque exceeds the maximum friction force.

In the suspension device S of this embodiment which is adapted to suppress relative vibration between a sprung member and an unsprung member of a vehicle, when an external force such that it suddenly extends/contracts the suspension device S is input, the linear motion of the threaded shaft 2 is increasingly accelerated to excessively increase the torque for rotating the ball screw nut 1, and the relative torque for relatively rotating the shaft 17 and the ball screw nut 1 exceeds a friction force resulting from the energizing force of the tolerance ring 20, causing spin of the ball screw nut 1 to the shaft 17. Then, only the ball screw nut 1 is rotated without rotation of the shaft 17, and the transmission of the torque generated in the motor M based on the moment of inertia or electromagnetic force to the ball screw nut 1 is thus suppressed.

In a situation as described above, or when the speed of stroke of the suspension device S is largely changed, accordingly, since the transmission of the torque generated in the motor M to the ball screw nut 1 is, suppressed to prevent a torque more than a relative torque permitted according to the energizing force of the tolerance ring 20 from acting on the ball screw nut 1, the effect of the moment of inertia of the motor M can be reduced to prevent the generated damping force of the suspension device S from being excessive, and transmission of a sudden vibration inputted to the unsprung member to the sprung member can be consequently suppressed.

Although the tolerance ring 20 is used as the torque limiter in the above, a friction body which causes the shaft 17 and the socket 1b generate a friction force can be interposed instead. As the friction body, for example, an annular rubber or an annular plate with rough surface can be adopted.

The relative torque adjusted by the tolerance ring 20 or the friction body can be set to an experimentally or empirically-obtained value so that the effect of the moment of inertia caused when passing over a projection or groove on road can be reduced, although it can be optionally adjusted according to a control object to which the suspension device S is applied.

In the suspension device S of this embodiment, since the effect of the moment of inertia in which the generated damping force becomes excessive due to superimposition of the moment of inertia of the motor M on the torque resulting from the electromagnetic force of the motor M can be reduced, the vehicle ride quality can be improved.

In other words, the motion conversion mechanism T is immune to breakage by an effect of excessive torque since a torque exceeding an allowable relative torque does not act on the ball screw nut 1, and flying of the magnet 18 fixed around the rotor 16 can be also prevented to reduce the load on the motor M since a large angular acceleration can be prevented from acting on the rotor 16 of the motor M. Thus, the reliability of the suspension device S is improved.

Further, according to the suspension device S of this embodiment, the stroke length can be easily ensured since the tolerance ring 20 as the torque limiter is interposed to the fitting part between the cylindrical shaft 17 of the motor M and the socket 1b of the ball screw nut 1 with a minimal effect on the whole length of the suspension device S, or the torque limiter is provided in a position never affecting the stroke length.

Although the shaft 17 is connected to the ball screw nut 1 through the tolerance ring 20 in this embodiment, the ball screw nut 1 may be directly attached to the shaft 17 of the rotor 16 if it is not needed to provide the torque limiter, or the magnet 18 may be attached to the outer circumference of the ball screw nut 1 by using the ball screw nut 1 itself as a shaft in the rotor 16 of the motor M. The idea of connecting the ball screw nut 1 to the motor M in this embodiment has an intent that whether direct connection or indirect connection is regardless, and the idea includes also use of the ball screw nut 1 itself as the rotor 16. When the ball screw nut 1 is directly attached to the shaft 17 of the rotor 16, a spline or key can be used as a stopper, and a structure in which the ball screw nut 1 is fitted to the inner circumference of the shaft 17 can be also adopted.

The thus-constituted actuator A is connected to a mount 22 through the rubber vibration isolator 21 installed to the installation part 5d on the outer circumference of the holder 5. Concretely, the mount 22 includes a mount cylinder 23; an annular plate 24 connected to a sprung member (not shown) of a vehicle; and a rubber pad 25 connecting the mount cylinder 23 to the plate 24, and the lower end inner circumference in FIG. 1 of the mount cylinder 23 is joined to the outer circumference of an embracing ring 26 which embraces the outer circumference of the rubber vibration isolator 21 installed to the outer circumference of the holder 5. The embracing ring 26 includes a U-shaped sectional embracing ring body 26a which embraces the rubber vibration isolator 21, and a cylindrical socket part 26b suspended from the lower end inner circumference in FIG. 1 of the embracing ring body 26a, and a spring receiver 43 is installed to the socket part 26b.

Thus, the actuator A is connected to the sprung member of the vehicle through the mount 22 by connecting the actuator A to the mount 22.

An outer cylinder 27 is joined to the outer circumference of the embracing ring 26 for embracing the rubber vibration isolator 21, and an annular and L-shaped sectional end cap 29 is screwed to the lower end in FIG. 1 of the outer cylinder 27 to support the lower end of an annular cushion 28 fitted to the lower end inner circumference of the outer cylinder 27.

Further, in this suspension device S, the threaded shaft 2 is serially connected to a rod 31 of the fluid pressure damper D through a connecting shaft 30 as shown in FIG. 1. The fluid pressure damper D is not shown in detail since it is well-known, but includes a cylinder 32; a piston (not shown), which is slidably inserted into the cylinder 32 to define two pressure chambers (not shown) within the cylinder 32; a rod 31 protruded out of the cylinder 32 with one end thereof being connected to the piston; and an air chamber or reservoir (not shown), which is formed within the cylinder 32 to compensate the volume of the rod protruded to and retreated from the cylinder 32, and the fluid pressure damper D exhibits a predetermined damping force during extending/contracting operation.

The fluid pressure damper D may be of a single cylinder type provided with air chambers within the cylinder 32 or a so-called double-cylinder type provided with an annular reservoir. The adoption of the double-cylinder type as the fluid pressure damper D has an advantage that the whole length of the suspension device S can be reduced by reducing the whole length of the fluid pressure damper D. An annular cushion 40 is provided on the upper end outer circumference of the rod 31. The annular cushion 40 butts on the upper end in FIG. 1 of the cylinder 32, when the fluid pressure damper D is contracted to the maximum, to reduce the impact in the maximum contraction.

In this suspension device S, the connecting shaft 30 is extended from the upper end of the rod 31 of the fluid pressure damper D, and the connecting shaft 30 includes a tapered part 30a that is an engagement part to be engaged with the fluid pressure damper-side end of the threaded shaft 2, the tapered part being formed by expanding the diameter of the lower end in FIG. 1 that is a base end connected to the upper end of the rod 31; and a thread part 30b formed at the upper end in FIG. 1 that is a leading end. Although the rod 31 and the connecting shaft 30 are molded as an integrated unit in this embodiment, the rod 31 and the connecting shaft 30 may be formed as separate members, and then connected to each other. Further, although the rod 31 is connected to the threaded shaft 2 by the connecting shaft 30 in this embodiment, an inverted type can be also adopted as the fluid pressure damper D to connect the cylinder 32 to the threaded shaft 2 by the connecting shaft 30.

An annular disk 33 to be fitted to the lower end of the threaded shaft 2 is installed to the outer circumference of the tapered part 30a of the connecting shaft 30, and a spring receiver 34 which works also as a bearing in the extending/contracting direction of the suspension device S in slidable contact with the inner circumference of the outer cylinder 27 is installed to the outer circumference of the disk 33. An annular bump cushion 41 is installed to the lower end outer circumference in FIG. 1 of the threaded shaft 2. The bump cushion 41 is restricted from moving downwardly by the disk 33, and butts on the lower end of the holder 5, when the actuator A is contracted to the maximum, to regulate the maximum contraction stroke length of the actuator A.

The maximum contraction stroke length of the suspension device S is thus regulated by the cushion 40 and the bump cushion 41, the cushion 40 regulating the maximum contraction stroke length of the fluid pressure damper D, and the bump cushion 41 regulating the maximum contraction stroke length of the actuator A.

The connecting shaft 30 is connected to the threaded shaft 2 by inserting the connecting shaft 30 into the threaded shaft 2, and screwing a nut 35 to the thread part 30b at the top end opposite to the fluid pressure damper D side. In this case, namely, the connecting shaft 30 is connected to the threaded shaft 2 by holding the threaded shaft 2 together with the disk 33 between the tapered part 30a of the connecting shaft 30 and the nut 35. The connecting shaft 30 can be accordingly connected to the threaded shaft 2 from the side opposite to the fluid pressure damper.

That is, in an assembling process for integrating the fluid pressure damper D to the actuator A, the fluid pressure damper D that is a heavy matter can be integrated to the actuator A not by connecting operation at the middle of the fluid pressure damper D and the actuator A, but only by operation from the upper side in FIG. 1 that corresponds to the side opposite to the fluid pressure damper. Therefore, the connecting operation of the fluid pressure damper D to the actuator A is facilitated, and the worker's burden can be also remarkably reduced.

The engagement of the engagement part of the connecting shaft 30, or the tapered part 30a in this case, with the fluid pressure damper side end part of the threaded shaft 2 includes, in addition to regulation of the upward movement in FIG. 1 of the connecting shaft 30 relative to the threaded shaft 2 by direct contact of the engagement part to the fluid pressure damper-side end part of the threaded shaft 2, regulation of the upward movement in FIG. 1 of the connecting shaft 30 relative to the threaded shaft 2 by interposition of a member such as the disk 33 between the fluid pressure damper-side end part of the threaded shaft 2 and the engagement part as described above. Although the shape of the engagement part is not limited to the tapered part 30a as long as the upward movement in FIG. 1 of the connecting shaft 30 relative to the threaded shaft 2 can be regulated, the adoption of the tapered part 30a has an advantage that the fastening and centering of the disk 33 to the threaded shaft 2 are facilitated. Even if a backlash occurs between the disk 33 and the threaded shaft 2, axial slippage of the spring receiver 34, which works as the bearing, relative to the threaded shaft 2 can be prevented by the upward fastening in FIG. 1 by the tapered part 30a, and smooth extension/contraction of the suspension device S can be maintained.

Further, in this embodiment, a collared cylindrical spacer 36 for centering the upper end of the connecting shaft 30 relative to the threaded shaft 2 is fitted to the upper opening of the threaded shaft 2, and the inner circumference of the spacer 36 slidably contacts with the outer circumference of the connecting shaft 30 to arrest shaking in the centering of the upper end of the connecting shaft 30 to the threaded shaft 2, whereby the connecting shaft 30 is prevented from interfering with the threaded shaft 2 when vibration is input. Since the shaking of the connecting shaft 30 can be prevented by the spacer 36, the loosening of the nut 35 in the input of vibration is also suppressed.

The connecting shaft 30 is set long since it is inserted into the threaded shaft 2 and connected to the threaded shaft 2 from the side opposite to the fluid pressure damper of the threaded shaft 2 as described above. Thus, the connecting shaft 30 itself can act as a longitudinal spring element to the threaded shaft 2 which moves in the vertical direction in FIG. 1 to suppress the rupture of the shaft or the loosening of the nut 35.

Additionally, since the threaded shaft 2 and the connecting shaft 30 are detachably thread-fastened in this case, only the fluid pressure damper D or only the motion conversion mechanism T of the components of the suspension device S can be easily replaced when required, and also can be disassembled to inspect only a failure point. Although the detachable connection of the threaded shaft 2 to the connecting shaft 30 facilitates the maintenance of the suspension device S and the component replacement thereof, stationary connection of the threaded shaft 2 to the connecting shaft 30 by welding, brazing or the like can be also basically adopted. This connection has no merit in the point of maintenance or component replacement, but has the same effect as the detachable connection of the threaded shaft 2 to the connecting shaft 30 in the point of facilitating the assembling of the fluid pressure damper D to the actuator A. That is, the connection of the threaded shaft 2 to the connecting shaft 30 includes not only the detachable connection but also fixation without schedule of detachment. The detachable connection can be performed by a method other than the thread fastening.

A cover cylinder 37 is provided on the lateral outer circumference of the cylinder 32 of the fluid pressure damper D to cover the cylinder 32 while forming an annular clearance from the cylinder 32, and the upper end of the cover cylinder 37 is folded to form a collar part 37a.

The collar part 37a of the cover cylinder 37 butts on a cushion 28 fitted to the lower end inner circumference in FIG. 1 of the outer cylinder 27 when the suspension device S is extended to the maximum, and the cushion 28 regulates the overall full extension of the suspension device S.

Since the fluid pressure damper D and the actuator A independently extend and contract, the overall maximum extension stroke length of the suspension device S reaches the total of maximum extension stroke lengths of the fluid pressure damper D and the actuator A without such regulation. Therefore, the overall maximum extension stroke length of the suspension device S is regulated by the collar part 37a and the cushion 28.

An annular spring receiver 42 is placed on the bottom of the cover cylinder 37 and housed in the lower end inner circumference of the cover cylinder 37. A spring 38 to be juxtaposed to the fluid pressure damper D is interposed between the spring receiver 42 and the lower end of the spring receiver 34, and a spring 39 to be juxtaposed to the actuator A is interposed between the spring receiver 43 installed to the socket part 26b of the embracing ring 26 and the upper end of the spring receiver 34. These springs 38 and 39 work as a suspension spring for supporting the weight of the sprung member of the vehicle, and also exhibit the function of positioning the rod 31 of the fluid pressure damper D to a neutral position relative to the cylinder 32, in which the spring 38 is juxtaposed to the fluid pressure damper D to energize the fluid pressure damper D in the extending direction, and the spring 39 is juxtaposed to the actuator A to energize the fluid pressure damper D in the contracting direction.

Since the upper ends of the springs 38 and 39 are supported by the embracing ring 26 connected to the mount 22, while the actuator A is elastically supported through the rubber vibration isolator 21 by the mount 22, vibration of the springs 38 and 39 as the suspension spring is not directly transmitted to the actuator A, and the vibration isolation to the suspension spring can be ensured.

The springs 38 and 39 also work to suppress transmission of vibration of the unsprung member of the vehicle toward the motor M side or to the sprung member, and also exert the effect of returning the rod 31 to the neutral position relative to the cylinder 32 of the fluid pressure damper D. Since the rod 31 is returned to the neutral position relative to the cylinder 32 by the springs 38 and 39 when the vibration of the suspension device S is converged, the piston can be prevented from being left as it is located in the vicinity of the upper end or lower end to the cylinder 32, and deterioration of vehicle ride quality or deterioration of reliability of the suspension device S resulting froM interference of the piston with the upper end or lower end of the cylinder 32 in subsequent input of vibration is never caused.

The neutral position referred to herein means a position where the rod 31 is positioned relative to the cylinder 32 in a state where the sprung member in the vehicle is supported by each spring 38, 39, but does not mean only a rod position where the piston connected to the end of the rod 31 is located at the center of the cylinder 32.

In this case, since the function of positioning the rod 31 of the fluid pressure damper D to the neutral position can be consolidated to the springs 38 and 39 as the suspension spring, it is not necessary to separately provide a spring which performs only the positioning function to the neutral position or performs only the suspension spring function, and the number of part items and the cost in the suspension device S can be reduced. However, when the springs 38 and 39 are abolished, and the positioning and returning of the rod 31 to the neutral position relative to the cylinder 31 is performed by use of a suspension spring housed within each pressure chamber in the fluid pressure damper D or the like, the suspension spring may be separately provided, and the suspension spring may be interposed indirectly between the mount 22 and the unsprung member by supporting the upper end of the suspension spring not only by the mount 22 but also by the sprung member.

The positioning and returning of the rod 31 to the neutral position relative to the cylinder 32 may be performed by a means other than the springs 38 and 39, for example, by folding the upper end of the cover cylinder 37 inwardly so that a pair of cylinder-side spring receivers immobile in the axial direction of the cylinder 32 is provided on the outer circumference of the cylinder 32 by the annular bottom of the cover cylinder 37 and the inwardly folded part at the upper end, disposing a rod-side spring receiver to be connected to the rod 31 between the cylinder-side spring receivers, and interposing each spring which energizes in the extending/contracting direction of the fluid pressure damper D each between the cylinder-side spring receivers and the rod-side spring receiver, or in two positions.

In this suspension device S, when high frequency vibration such as a vibration with relatively large acceleration, for example, is input to the unsprung member in a case such that the vehicle travels along a bad road or runs on a projection on road, the fluid pressure damper D works to absorb this vibration energy so that the vibration is hardly transmitted to the threaded shaft 2 side, coupled with the vibration transmission suppressing effect by the springs 38 and 39, since it is serially connected to the threaded shaft 2 which is linearly moved by the motor M.

The suspension device S of this embodiment adapted to convert a vibration inputted from the unsprung member that is a linear motion into a rotational motion includes many rotating members, and has properties such that it tends to transmit the vibration of the unsprung member to the sprung member because the moment of inertia to high frequency vibration is large due to large inertial masses of the rotating members, coupled with the effect of friction between the spring receiver 34 and the outer cylinder 27. However, as described above, the fluid pressure damper D absorbs the vibration, and further the springs 38 and 39 exhibit the vibration transmission suppressing effect, whereby the transmission of the vibration to the threaded shaft 2 is suppressed. Therefore, this suspension device S never causes deterioration of vehicle ride quality even in such a case.

Further, since direct action of high frequency vibration on the motor M and the ball screw nut 1 is prevented by the fluid pressure damper D, transmission of high frequency vibration with particularly large acceleration to the motor M and the ball screw nut 1 is suppressed. Thus, the reliability of the motor M and the ball screw nut 1 that are essential components of the suspension device S is improved, and the reliability of the suspension device S can be consequently improved.

Further, the spring receiver 34, which works as the bearing for the overall extension/contraction of the suspension device S in slidable contact with the inner circumference of the outer cylinder 27 as described above, never presents a resistance to the extension/contraction of the fluid pressure damper D which absorbs high frequency vibration, since it does not move in the vertical direction in FIG. 1 that is the axial direction relative to the outer cylinder 27 in response to extension/contraction of only the fluid pressure damper D.

That is, the spring receiver 34 which works as the bearing is in slidable contact with a position which does not affect the extension/contraction of the fluid pressure damper D to ensure smooth extension/contraction of the fluid pressure damper D. In this suspension device S, therefore, the fluid pressure damper D is actively extended/contracted, upon input of high frequency vibration, to absorb the vibration, whereby the vibration insulation property to the sprung member can be improved.

Further, in this embodiment, since the spring receiver 34 works as the bearing, it is not necessary to separately provide a bearing which works only as a bearing, and the number of part items can be reduced. When the spring receiver 34 is not caused to work as the bearing, and a bearing is separately provided, the bearing can be set between the outer cylinder 27 and the cover cylinder 37 although it presents a resistance to the expansion/contraction of the fluid pressure damper D.

In addition, since the spring receiver 34 which works as the bearing does not interfere with the extension/contraction of the fluid pressure damper D upon input of high frequency vibration, direct action of impact force on the actuator A is suppressed. Accordingly, the motor M and the motion conversion mechanism T can be protected to improve the reliability of the actuator A that is an essential component of the suspension device S, and the reliability of the suspension device S can be improved by dissolving the defect of the conventional suspension device.

In this embodiment, since the actuator A is elastically supported by the mount 22 connected to the sprung member through the rubber vibration isolator 21, the vibration of the actuator A with large inertial weight can be prevented from being directly transmitted to the sprung member, and since the actuator A is vibration-isolated from the springs 38 and 39 as the suspension spring due to the presence of the rubber vibration isolator 21, excitation of the sprung member by the inertia of the actuator A vibrating in the middle between the sprung member and the unsprung member can be also suppressed.

Further, by adopting the above-mentioned structure in which the actuator A is elastically supported while being isolated from the springs 38 and 39 as the suspension spring, even in a situation such that high frequency vibration cannot be sufficiently absorbed by the fluid pressure damper D, and the actuator A difficult to extend/contract in response to input of high frequency vibration as described above reaches a so-called bar-like state, this vibration can be absorbed by the rubber vibration isolator 21 to break the transmission of the vibration to the sprung member.

Since the actuator A and the fluid pressure damper D are housed in the outer cylinder 27, the cover cylinder 37 and the mount 22 to isolate the essential drive part of the suspension device S from the outside of the suspension device S in the suspension device S, penetration of rainwater into the suspension device S and contact of flying stones to the essential drive part can be surely prevented. Accordingly, the practicability of the suspension device S is improved.

When the thus-constituted suspension device S is actually assembled, the motion conversion mechanism T and the fluid pressure damper D can be integrated by inserting the connecting shaft 30 connected to the rod 31 of the fluid pressure damper D into the disk 33 installed with the spring receiver 34 and the threaded shaft 2 of the assembly which is composed of only the motion conversion mechanism T retained by the holder 5, and screwing the nut 35 to the thread part 30*b* at the upper end of the connecting shaft 30 from the upper end side in FIG. 1, and the motor M is thereafter mounted on the upper end of the holder 5, whereby the assembling of the suspension device S is completed.

Since the motor M includes the cylindrical shaft 17 so as to insert the threaded shaft 2 into the shaft 17, the shaft 17 of the motor M can be connected to the ball screw nut 1 in the motion conversion mechanism T from the side opposite to the fluid pressure damper after integrating the motion conversion mechanism T to the fluid pressure damper D, and the assembling process of the suspension device S is further facilitated.

In this embodiment, the ball spline nut 3 to be engaged with the spline groove provided in the outer circumference of the threaded shaft 2 is adopted as the locking mechanism since smooth vertical movement of the threaded shaft 2 can be ensured. Otherwise, the locking mechanism can be retained by the holder 5 by simply forming a groove in the outer circumference of the threaded shaft 2 along its axial line, and fitting a member which does not inhibit the vertical movement of the threaded shaft 2 such as a key to the groove to lock the threaded shaft 2.

The scope of the present invention is never limited to those shown or described in detail herein.

INDUSTRIAL APPLICABILITY

The suspension device of the present invention can be used for a vehicular suspension.

The invention claimed is:

1. A suspension device, comprising:
an actuator including a motion conversion mechanism for converting rotational motion of a screw nut to linear motion of a threaded shaft, and a motor connected to the screw nut;
a connector element; and
a fluid pressure damper connected to the threaded shaft, wherein the threaded shaft is formed in a cylindrical shape, a connecting shaft for connecting a rod or a cylinder of the fluid pressure damper to the threaded shaft is inserted into the threaded shaft, and the connecting shaft is connected to the threaded shaft via said connector element from the side opposite to the fluid pressure damper, said connecting shaft comprising a threaded end portion on said side opposite to the fluid pressure damper, said connector element comprising a nut element, said nut element engaging said threaded end portion of said shaft.

2. A suspension device according to claim 1, wherein the connecting shaft is detachably connected to the threaded shaft.

3. A suspension device according to claim 1, further comprising a cylindrical spacer which is fitted to an end, opposite to the fluid pressure damper, of the threaded shaft to perform centering of the connecting shaft, said cylindrical spacer being arranged between said connecting shaft and said threaded shaft.

4. A suspension device according to claim 1, wherein the motor includes a cylindrical shaft, and the threaded shaft is inserted into the shaft.

5. A suspension device according to claim 2, further comprising a cylindrical spacer which is fitted to an end, opposite to the fluid pressure damper, of the threaded shaft to perform centering of the connecting shaft, said cylindrical spacer being located between a portion of said connecting shaft and a portion of said threaded shaft.

6. A suspension device according to claim 2, wherein the motor includes a cylindrical shaft, and the threaded shaft is inserted into the shaft.

7. A suspension device according to claim 3, wherein the motor includes a cylindrical shaft, and the threaded shaft is inserted into the shaft.

8. A suspension device according to claim 1, wherein said threaded shaft comprises a shaft end portion on said side opposite to the fluid pressure damper, said shaft end portion engaging said nut element.

9. A suspension device according to claim 8, further comprising:
an annular disk element;
a spring receiver connected to said annular disk element, at least a portion of said shaft end portion engaging said annular disk element, said connecting shaft having a connecting shaft end portion, said connecting shaft end portion being located opposite said nut element and said threaded end portion, at least a portion of said connecting shaft end portion engaging said annular disk element;
a first spring;
a second spring, said first spring engaging one side of said spring receiver, said second spring engaging another side of said spring receiver, said one side of said spring receiver being opposite said another side of said spring receiver.

10. A suspension device, comprising:
an actuator including a threaded shaft, a screw nut, a motion conversion mechanism for converting rotational motion of said screw nut to linear motion of said threaded shaft, and a motor connected to said screw nut, said threaded shaft comprising a threaded shaft end portion;

a connector element;
a fluid pressure damper connected to the threaded shaft, wherein the threaded shaft comprises a cylindrical shape; and
a connecting shaft connecting said fluid pressure damper to said threaded shaft, at least a portion of said connecting shaft being inserted into the threaded shaft, said connecting shaft having a connecting shaft end portion, said connecting shaft end portion being connected to said threaded shaft end portion via said connector element on a side opposite to the fluid pressure damper.

11. A suspension device according to claim 10, wherein said connecting shaft end portion comprises a plurality of threads, said connector element comprising a nut element, said nut element engaging one or more of said threads, at least a portion of said threaded shaft end portion engaging said nut element.

12. A suspension device according to claim 11, further comprising:
an annular disk element;
a spring receiver connected to said annular disk element, said connecting shaft comprising another connecting shaft end portion, said another connecting shaft end portion being located opposite said connecting shaft end portion, at least a portion of said another connecting shaft end portion engaging said annular disk element, said threaded shaft having another threaded shaft end portion, said another threaded shaft end portion being located opposite said nut element and said threaded shaft end portion, at least a portion of said another threaded shaft end portion engaging said annular disk element;
a first spring;
a second spring, said first spring engaging one side of said spring receiver, said second spring engaging another side of said spring receiver, said one side of said spring receiver being opposite said another side of said spring receiver.

13. A suspension device, comprising:
an actuator including a threaded shaft, a screw nut, a motion conversion mechanism for converting rotational motion of said screw nut to linear motion of said threaded shaft, a motor connected to said screw nut and a motor casing, said threaded shaft comprising a threaded shaft end portion, said motor casing comprising a motor casing inner surface;
a connector element;
a fluid pressure damper connected to the threaded shaft, wherein the threaded shaft comprises a cylindrical shape; and
a connecting shaft connecting said fluid pressure damper to said threaded shaft, at least a portion of said connecting shaft being arranged in said threaded shaft, said connecting shaft having a connecting shaft end portion, said connecting shaft end portion being connected to said threaded shaft end portion via said connector element on a side opposite said fluid pressure damper, said connecting shaft end portion and said threaded shaft end portion being located at a spaced location from said motor casing inner surface.

14. A suspension device according to claim 13, wherein said connecting shaft end portion comprises a plurality of threads, said connector element comprising a nut element, said nut element engaging one or more of said plurality of threads, said threaded shaft end portion engaging said nut element.

15. A suspension device according to claim 14, further comprising:
an annular disk element;
a spring receiver connected to said annular disk element, said connecting shaft comprises another connecting shaft end portion, said another connecting shaft end portion being located opposite said nut element and said connecting shaft end portion, at least a portion of said another connecting shaft end portion engaging said annular disk element, said threaded shaft having another threaded shaft end portion, said another threaded shaft end portion being located opposite said nut element and said threaded shaft end portion, at least a portion of said another threaded shaft end portion engaging said annular disk element;
a first spring;
a second spring, said first spring engaging one side of said spring receiver, said second spring engaging another side of said spring receiver, said one side of said spring receiver being opposite said another side of said spring receiver.

16. A suspension device, comprising:
an actuator including a motion conversion mechanism for converting rotational motion of a screw nut to linear motion of a threaded shaft, and a motor connected to the screw nut;
a connector element; and
a fluid pressure damper connected to the threaded shaft, wherein the threaded shaft is formed in a cylindrical shape, a connecting shaft for connecting a rod or a cylinder of the fluid pressure damper to the threaded shaft is inserted into the threaded shaft, and the connecting shaft is connected to the threaded shaft via said connector element from the side opposite to the fluid pressure damper, said connector element comprising a nut, the connecting shaft including an engagement part to be engaged with a fluid pressure damper-side end of the threaded shaft, and the connecting shaft is thread-fastened to said nut screwed to a leading end thereof and the threaded shaft while engaging the engagement part with the threaded shaft.

17. A suspension device, comprising:
an actuator including a motion conversion mechanism for converting rotational motion of a screw nut to linear motion of a threaded shaft, and a motor connected to the screw nut;
a connector element; and
a fluid pressure damper connected to the threaded shaft, wherein the threaded shaft is formed in a cylindrical shape, a connecting shaft for connecting a rod or a cylinder of the fluid pressure damper to the threaded shaft is inserted into the threaded shaft, and the connecting shaft is connected to the threaded shaft via said connector element from the side opposite to the fluid pressure damper, said connecting shaft being detachably connected to the threaded shaft, said connector element comprising a nut, the connecting shaft including an engagement part to be engaged with a fluid pressure damper-side end of the threaded shaft, said connecting shaft being thread-fastened to said nut screwed to a leading end thereof and the threaded shaft while engaging the engagement part with the threaded shaft.

* * * * *